(12) United States Patent
Lipscombe et al.

(10) Patent No.: US 12,504,398 B2
(45) Date of Patent: Dec. 23, 2025

(54) AIR PURIFICATION SYSTEM FOR AN ION MOBILITY SPECTROMETER, CORRESPONDING METHOD OF OPERATION AND ION MOBILITY SPECTROMETER

(71) Applicant: SMITHS DETECTION-WATFORD LIMITED, Hemel Hempstead (GB)

(72) Inventors: Oliver Jon Lipscombe, Hemel Hempstead (GB); Alex Edward Parker, Hemel Hempstead (GB); Alastair Clark, Hemel Hempstead (GB); Alastair Beadle, Hemel Hempstead (GB)

(73) Assignee: Smiths Detection-Watford Limited, Hemel Hempstead (GB)

( * ) Notice: Subject to any disclaimer, the term of this patent is extended or adjusted under 35 U.S.C. 154(b) by 429 days.

(21) Appl. No.: 18/003,778

(22) PCT Filed: Jun. 29, 2021

(86) PCT No.: PCT/GB2021/051636
§ 371 (c)(1),
(2) Date: Dec. 29, 2022

(87) PCT Pub. No.: WO2022/003333
PCT Pub. Date: Jan. 6, 2022

(65) Prior Publication Data
US 2023/0236151 A1 Jul. 27, 2023

(30) Foreign Application Priority Data
Jul. 3, 2020 (GB) ...................................... 2010253

(51) Int. Cl.
*G01N 27/622* (2021.01)
*B01D 53/04* (2006.01)

(52) U.S. Cl.
CPC ....... *G01N 27/622* (2013.01); *B01D 53/0438* (2013.01); *B01D 2253/108* (2013.01);
(Continued)

(58) Field of Classification Search
CPC .. G01N 27/622; G01N 27/624; G01N 27/623; B01D 53/00; B01D 53/0438;
(Continued)

(56) References Cited

U.S. PATENT DOCUMENTS 4,552,570 A 11/1985 Gravatt
6,815,670 B2 11/2004 Jenkins et al.
(Continued)

FOREIGN PATENT DOCUMENTS

CN 103515182 A 1/2014
CN 207923777 U 9/2018
(Continued)

OTHER PUBLICATIONS

PCT International Search Report and Written Opinion, Application No. PCT/GB2021/051636, dated Jan. 9, 2021, 18 pages.
(Continued)

*Primary Examiner* — Jason L McCormack
(74) *Attorney, Agent, or Firm* — Armstrong Teasdale LLP

(57) ABSTRACT

A method of operating an air purification system (24") of an ion mobility spectrometer, the method comprising: operating the ion mobility spectrometer in a first sampling mode comprising circulating a flow of air around a closed air circulation system comprising a drift chamber (12) of the ion mobility spectrometer and a first sieve (70) of the air purification system; and operating the ion mobility spectrometer in a first regeneration mode comprising heating the first sieve and circulating a first flow of air through a second sieve (72) of the air purification system and through the drift
(Continued)

chamber (12) while passing a second flow of air through the first sieve (70) to an outtake (76).

19 Claims, 1 Drawing Sheet

(52) U.S. Cl.
CPC ...... *B01D 2257/80* (2013.01); *B01D 2258/06* (2013.01); *B01D 2259/40088* (2013.01)

(58) Field of Classification Search
CPC .......... B01D 2253/108; B01D 2257/80; B01D 2258/06; B01D 2259/40088; H01J 49/00; H01J 49/02; H01J 49/04; H01J 49/0404; H01J 49/0422; H01J 49/0495; H01J 49/26
USPC ........................................ 250/281, 282, 288
See application file for complete search history.

(56) References Cited

U.S. PATENT DOCUMENTS

| | | | |
|---|---|---|---|
| 2009/0174412 A1* | 7/2009 | Atkinson | G01N 27/622 |
| | | | 250/288 |
| 2018/0172650 A1* | 6/2018 | Platow | B01D 53/0407 |

FOREIGN PATENT DOCUMENTS

| | | |
|---|---|---|
| CN | 109900779 A | 6/2019 |
| CN | 110665330 A | 1/2020 |
| GB | 2600663 B | 8/2023 |
| JP | 2009501925 A | 1/2009 |
| SU | 1004858 A1 | 3/1983 |
| WO | 2012118744 A1 | 9/2012 |

OTHER PUBLICATIONS

GB Search and Examination Report, Application No. 2010253.9, dated Jul. 6, 2021, 17 pps.

* cited by examiner

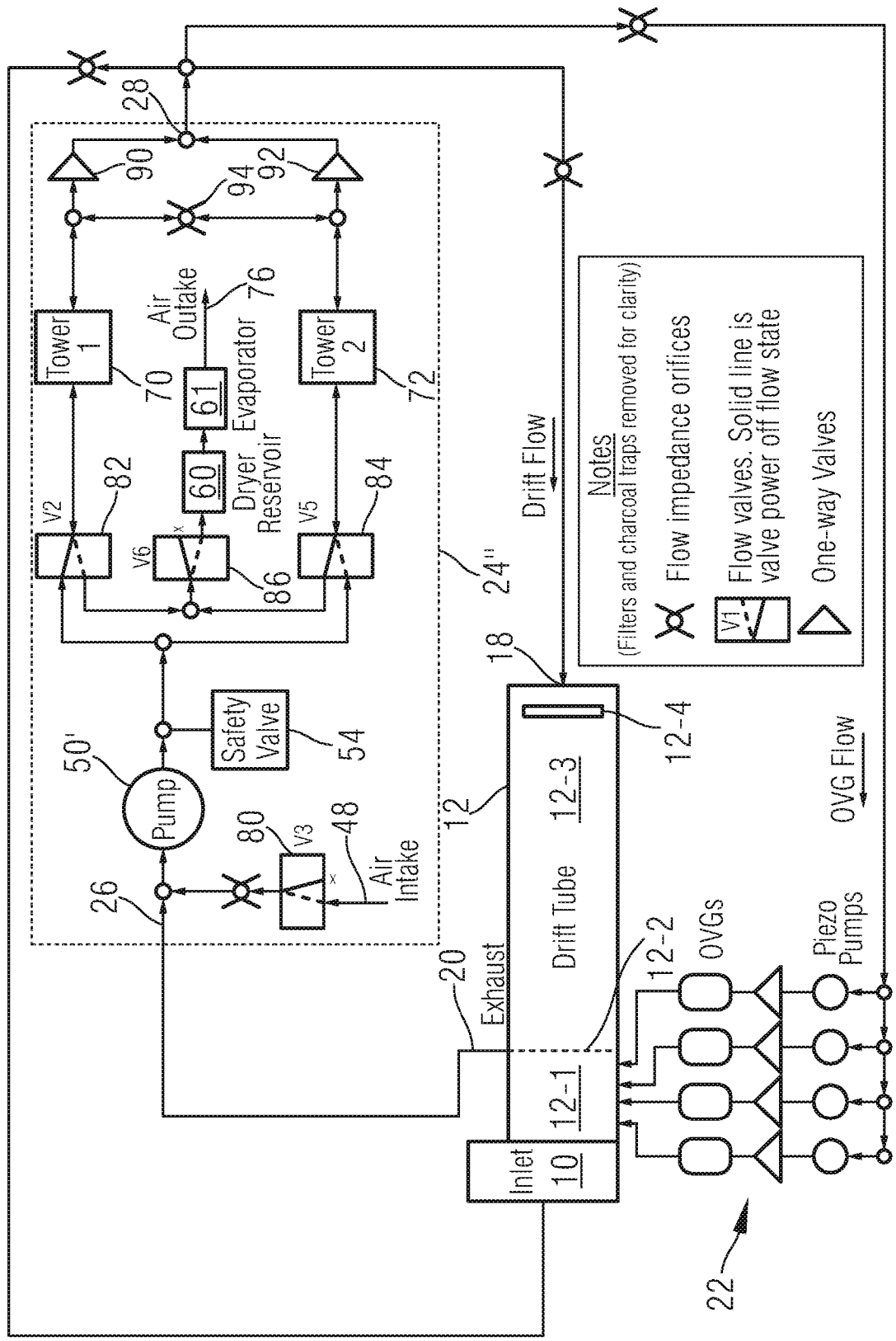

AIR PURIFICATION SYSTEM FOR AN ION MOBILITY SPECTROMETER, CORRESPONDING METHOD OF OPERATION AND ION MOBILITY SPECTROMETER

FIELD OF INVENTION

The present invention relates to methods and apparatus, and more particularly to air purification systems such as those which may be used in trace detection apparatus such as ion mobility spectrometers.

BACKGROUND

In ion mobility spectrometers, and other systems which sample vapours, it may be useful to provide a flow of cleaned dried air. Typically a molecular sieve, often in a so-called sieve pack is used for this purpose. Usually the molecular sieve is provided by a large number of spheres, about 2 mm in diameter, of a zeolite material packed into an outer housing connected in the gas flow path through the detector. Different diameter spheres could be used, and materials other than zeolites. Gas flowing through the detector is circulated through the sieve before being recirculated in the detector. Whilst flowing through the pack, gas follows a tortuous path around the outside of the spheres with some of the gas flowing through the spheres. These packs (which may also be referred to as towers) may comprise a solid block of zeolite held in a closely fitting housing. Such a block may have multiple passages through which gas can flow. A variety of configurations can be used for such a sieve.

Over time, the sieve may become less effective. For example it may accumulate moisture and so be less able to take up moisture from air flowing through it. Excessive moisture in drift gas of ion mobility spectrometers is known to be a problem.

To overcome this problem, sieve packs may be regenerated by heating them while flowing gas through them. This typically requires the sieve to be removed from the detector and replaced or for the detector to be taken out of service.

In a "total loss" air purification system dry air flowing through the chemical detection system is continually pumped in from the external ambient air and cleaned and dried using molecular sieve before it is used in the detector. The air leaving the detector is pumped out of the detector into the atmosphere ('lost'), and hence the air flow is "total loss". This is in contrast to the "closed loop" approach, where under normal operation the dry air flow is pumped in a continuous loop with molecular sieving drying the air in the loop—i.e. no air (intentionally) enters or leaves the system.

Such systems generally require additional components for performing sieve regeneration. These components may be bulky and heavy, which in portable detectors can be a problem.

SUMMARY

Aspects and examples of the present disclosure are set out in the claims and aim to address at least a part of the above described technical problems, and other problems.

An aspect of the disclosure provides a method of operating an air purification system of an ion mobility spectrometer so that it may provide simultaneous bake-out of the drift tube and detector inlet whilst also regenerating a molecular sieve. One such method is set out in claim 1, which comprises selectively operating the ion mobility spectrometer in either a sampling mode or a regeneration mode, but in some embodiments concurrent sampling and regeneration may be performed.

Examples of the methods defined in claim 1 may comprise switching the ion mobility spectrometer into a second regeneration mode, the second regeneration mode comprising heating the second sieve and circulating the first flow of air through the first sieve of the air purification system and through the drift chamber while passing the second flow of air through the second sieve to an outtake to be expelled, e.g. from the ion mobility spectrometer. Such methods may also comprise switching the ion mobility spectrometer into a second sampling mode in which the second sieve is used in place of the first sieve in the closed air circulation system. Switching between modes may comprise stopping operation in one mode before starting operation in the other mode.

Another method of operating an air purification system of an ion mobility spectrometer so that it may provide simultaneous bake-out of the drift tube and detector inlet whilst also regenerating a molecular sieve is also disclosed. One such method comprises operating the ion mobility spectrometer in a first regeneration mode comprising heating a first sieve and circulating a first flow of air through a second sieve of the air purification system and through a drift chamber while passing a second flow of air through the first sieve to an outtake to be expelled, e.g. from the ion mobility spectrometer; and switching the ion mobility spectrometer into a second regeneration mode, the second regeneration mode comprising heating the second sieve and circulating the first flow of air through the first sieve of the air purification system and through the drift chamber while passing the second flow of air through the second sieve to an outtake to be expelled, e.g. from the ion mobility spectrometer. This method may also comprise operating the air purification system in one of two possible sampling modes, and may comprise selectively switching between the two sampling modes. A first sampling mode may comprise circulating a flow of air around a closed air circulation system comprising the drift chamber of the ion mobility spectrometer and the first sieve of the air purification system. In the second sampling mode the second sieve may be switched into connection with the drift chamber so that the second sieve is used in place of the first sieve in the closed air circulation system. The first sampling mode may be operated concurrently with the second regeneration mode and vice versa.

In addition to such concurrent operation, it will be appreciated in the context of the present disclosure, that this and other aspects of the disclosure may be operated to provide:

(1) operation in the first sampling mode or second sampling mode followed by operation in a corresponding one of the first regeneration mode and the second regeneration mode.

(2) operation in the first sampling mode followed by operation in the second regeneration mode, and vice versa.

The methods described herein may comprise switching through the modes in a sequence, such as a cycle in which the sieve used for sampling is the sieve which was heated in the preceding mode of operation. For example the cycle may comprise switching between the modes in the following sequence: first sampling mode to second regeneration mode to second sampling mode to first regeneration mode to first sampling mode, and so forth.

In the first regeneration mode the second flow of air may be provided from the second sieve. In the first regeneration mode, a flow of ambient air may be mixed with air taken from the ion mobility spectrometer. In the first regeneration mode the second flow may be provided by part of the first flow. The part of the first flow may be separated from the first flow using a flow orifice. Separating the first flow may comprise operating an outtake valve to allow the second flow of air to flow to the outtake.

An aspect provides an air purification system for an ion mobility spectrometer, the system comprising:
- an inlet and an outlet, wherein the inlet and the outlet are configured to connect the air purification system to the drift chamber of the ion mobility spectrometer to form a closed air circulation system;
- an outtake for expelling air from the system, e.g. and expelling it from the spectrometer;
- a first sieve, and a second sieve,
- wherein the air purification system is configured to provide a first sampling mode in which air is circulated around the closed air circulation system and the first sieve is connected to form part of the closed air circulation system.

The air purification system may be configured to be switched from the sampling mode into one of:
(a) a first regeneration mode in which the first sieve is heated and a first flow of air is circulated through the second sieve and through the drift chamber while passing a second flow of air through the first sieve to the outtake to be exhausted from the ion mobility spectrometer; and
(b) a second regeneration mode in which the second sieve is heated and the first flow of air is circulated through the first sieve and through the drift chamber while passing the second flow of air through the second sieve to the outtake to be exhausted from the ion mobility spectrometer.

In the first regeneration mode the second flow of air may be provided from the second sieve. In the first regeneration mode, a flow of ambient air may be mixed with air taken through the inlet from the ion mobility spectrometer. In the first regeneration mode the second flow may be provided by part of the first flow.

The air purification system may be further configured to provide a second sampling mode in which the second sieve is used in place of the first sieve in the closed air circulation system. The second sampling mode and the first regeneration mode may be operated concurrently. These and other embodiments may reduce the downtime of the system required for regeneration of the sieves.

The second sampling mode and the first regeneration mode may be operated concurrently. Concurrent operation of these two modes may comprise using the first flow of air to provide the drift gas for operation of the ion mobility spectrometer to analyse a sample while heating the first sieve to regenerate the first sieve. Thus the second sieve can be used for sampling operations of the IMS while the first sieve is regenerated.

A flow controller such as a flow orifice may be arranged to separate the part from the first flow to provide the second flow. The system may comprise an outtake valve which can be opened to allow the second flow of air to flow to the outtake, and which can be closed to prevent said flow to the outtake.

The air purification system may be further configured to be switched into a second regeneration mode in which the second sieve is heated and the first flow of air is circulated through the first sieve and through the drift chamber while passing the second flow of air through the second sieve to the outtake to be expelled from the ion mobility spectrometer.

The air purification system may be configured to switch through the modes in a sequence, such as cycle in which the sieve used for sampling is the sieve which was heated in the preceding mode of operation. For example the cycle may comprise switching between the modes in the following sequence: 1st sampling mode to 2nd regeneration mode to 2nd sampling mode to 1st regeneration mode to 1st sampling mode, and so forth.

An aspect also provides an ion mobility spectrometer comprising an air purification system such as any of those described and/or claimed herein. One such ion mobility spectrometer comprises:
- an air purification system having an inlet and an outlet and a first sieve and a second sieve selectively connectable between the inlet and the outlet;
- a drift chamber connected between the outlet and the inlet of the air purification system so that cleaned dried air from the outlet of the air purification system can be provided through the drift chamber;
- an outtake, connected to the air purification system, for expelling air from the ion mobility spectrometer; and
- a heater
- wherein the air purification system is configured to regenerate the first sieve by heating the first sieve and diverting air dried by the second sieve through the first sieve to the outtake.

Optionally, during regeneration of the first sieve air dried by the second sieve is also circulated from the outlet of the air purification system through the drift chamber to the inlet of the air purification system. The air purification system may also be configured to regenerate the second sieve by heating the second sieve and diverting air dried by the first sieve through the second sieve to the outtake.

During regeneration of the second sieve, air dried by the first sieve is also circulated from the outlet of the air purification system through the drift chamber to the inlet of the air purification system.

In one embodiment of the present disclosure weight and bulk may be reduced, for example because the need for semi-permeable materials (such as Nafion) can be avoided, as can the need for additional pumps and other hardware. These advantages may be achieved using inexpensive one-way 'check' valves and perhaps some additional and inexpensive filters.

In an embodiment, during sampling, the flow of gas travels through only one of two sieves, while the 'other tower' is unused (or even may be being regenerated). In an embodiment, in a regeneration mode, some of the flow out of one sieve is routed to flow (e.g. backwards) through the other sieve, while the other sieve is heated and thus regenerated. The wet air out of the regenerating tower is expelled from the unit into the ambient atmosphere.

To make up for the loss of air out of the regenerating tower, an air intake (e.g., with a fixed impedance) may be opened to take in some air upstream from the sieves (in the case shown in FIG. 1 the intake is on the pump input).

In some embodiments, such as those described with reference to FIG. 1, during regeneration there is still a flow of clean and dry air available for the detector. This dry air flow may be used to bake-out the detector (e.g., the sampling channel and/or the inlet and/or the drift tube 12) concurrently with the regeneration of the sieve. It may also be possible to allow sampling by the detector during regeneration.

Other embodiments are envisaged as will be appreciated by the skilled addressee in the context of the present disclosure.

BRIEF DESCRIPTION OF DRAWINGS

Embodiments of the disclosure will now be described in detail with reference to the accompanying drawings, in which:

FIG. 1 shows an ion mobility spectrometer having an air purification system.

SPECIFIC DESCRIPTION

FIG. 1 illustrates an ion mobility spectrometer system comprising a detector inlet 10, and a drift tube 12. The detector inlet 10 is connected to the drift tube by a sampling means, such as sampling means which provide a restriction of bulk flow (e.g. a membrane or pinhole) or by sampling means which provide a direct connection such as a tube. Flow passages allow a flow of air carrying sample to be introduced to the detector inlet, such as flows which can carry sample from a desorber to the sampling means where it can be introduced to the drift tube 12.

The drift tube 12 may comprise a reaction region 12-1, which is connected to the detector inlet by the flow passages and separated from a drift region 12-3 by a gate 12-2. A detector 12-4 such as a Faraday cup may be arranged at the other end of the drift region 12-3 from the gate 12-2 for performing ion mobility spectrometry to identify substances of interest in samples introduced into the spectrometer via the detector inlet 10.

It will be appreciated that, when in use for performing analysis of a sample, a drift gas is generally flowed along the drift region 12-3, from the detector 12-4 towards the gate. A drift gas inlet 18 is therefore disposed at the same end of the drift region 12-3 as the detector, whilst a drift gas outlet 20 is disposed at the end of the drift region 12-3 adjacent the gate 12-2 e.g. close to the sample inlet, for example between the sample inlet and the gate.

A vapour dosing system 22 may also be connected to the drift tube 12 for delivering doses of calibrants, dopants, and other substances into the drift tube 12.

The ion mobility spectrometer illustrated in FIG. 1 comprises an air purification system 24" for cleaning and drying air, e.g. including the drift gas, which circulates in the ion mobility spectrometer. The air purification system 24" comprises an inlet 26 for receiving air which is to be cleaned and dried, and an outlet 28 for providing the cleaned dried air for use in the ion mobility spectrometer.

The outlet 28 of the air purification system 24 is connected to the drift gas inlet 18 and to the vapour dosing system 22, for providing a flow of air which can be used to carry doses of vapour from the vapour dosing system 22 into the drift tube 12.

The apparatus illustrated in FIG. 1 comprises a heater. Multiple heaters may be provided, for example one heater for each sieve, and other heaters for other components in the detection system. In the interests of clarity, the heaters are not shown separately in the drawings but may be operable to heat the sieve(s) and or the rest of the detector to a high temperature such as at least 200° C. The heater may be arranged so that one of the two sieves can be heated more than the other, for example so that one sieve can be heated to at least 200° C. while the other sieve remains at normal operating temperature.

The ion mobility spectrometer illustrated in FIG. 1 comprises a plurality of three-port valves 34, 36, 38, 40. Each of these valves comprises a primary port, a secondary port and a tertiary port. The primary port is selectively connectable to either the secondary port or to the tertiary port. The three-port valves are arranged so that when the primary port is connected to the secondary port, the tertiary port is closed (e.g. isolated from the primary port) so that fluid cannot follow into or out from the tertiary port. Similarly, when the primary port is connected to the tertiary port, the secondary port is closed in the same way. When these three-port valves are in an off state, the primary port is connected to the secondary port, and the tertiary port is closed. It will be appreciated in the context of the present disclosure that any other flow control means may be used to provide the flow diverting functions described herein and attributed to these valves.

The drift gas outlet 20 of the drift tube 12 is connected by flow passages to the inlet 26 of the air purification system 24".

The inlet 26 of the air purification system 24" is connected to the intake of a first pump 50'. The intake of that pump 50' is also connected to the primary port of a fifth three-port valve 80 (referred to as the intake valve 80 hereinafter). The tertiary terminal of the intake valve 80 is connected to an ambient air intake 48, and its secondary port is blocked. Thus in the off-state of this valve 80 the intake of the first pump is connected only to the inlet 26 of the air purification system 24", whereas the intake 48 from ambient air is closed.

The outtake of the first pump 50' is connected to a safety valve 54, and to the secondary port of an sixth three-port valve 82 (referred to hereinafter as the first sieve valve 82), and to the tertiary port of a seventh three-port valve 84 (referred to hereinafter as the second sieve valve 84). The tertiary port of the first sieve valve 82, and the secondary port of the second sieve valve 84, are both connected to the primary port of a tenth three-port valve 86, referred to hereinafter as an air outtake valve 86. The tertiary port of the outtake valve 86 is connected by a drier reservoir 60 to an evaporator 61, and by the evaporator 61 to an air outtake 76 of the air purification system 24" for venting air to the surrounding atmosphere. The secondary port of the outtake valve 86 is blocked, so that when the outtake valve 86 is off, the outtake of the air purification system 24" is closed.

The primary port of the first sieve valve 82 is connected to a first port of a first molecular sieve 70. The primary port of the second sieve valve is connected to a first port of a second molecular sieve 72. The first molecular sieve 70 has a second port, which is connected to the input of a first one-way valve 90, to the input of a second one way valve 92, and to the second port of a second molecular sieve 72. The second port of the second molecular sieve 72 is thus also of course connected to the second port of the first molecular sieve 70 and to the inputs of the two one way valves 90, 92. A flow impedance orifice 94 is provided in the connection between the second port of the first molecular sieve 70 and the second port of the second molecular sieve 72 (this same orifice 94 thus also separates the inputs of the two one way valves. The outputs of the two one way valves 90, 92 are connected together to the output of the air purification system 24".

TABLE 2

| | Intake valve 80 | 1st sieve valve 82 | 2nd sieve valve 84 | Outtake valve 86 | Pump |
|---|---|---|---|---|---|
| Sampling1 | Off | Off | Off | Off | On |
| Sampling2 | Off | On | On | Off | On |
| Bake-out + Regen2 | On | Off | Off | On | On |
| Bake-out + Regen1 | On | On | On | On | On |

The system illustrated in FIG. 1 has two modes of operation, and each mode has two states.

Sampling—state 1
Sampling—state 2
Bake-out+Regen state 1
Bake-out+Regen state 2

In the sampling mode of operation a flow of air is routed through the sampling channel to the inlet of the drift tube 12. In sampling state 1 the two sieve valves are both off and the outtake valve is off. Thus, in the air purification system, air flowing into the inlet of the air purification system 24" is routed through the first molecular sieve, and the first one way valve, to the outlet of the purification system. Conversely, in sampling state 2, the two sieve valves are both on so air flowing into the inlet of the air purification system is routed through the second molecular sieve, and the second one way valve, to the outlet of the purification system.

The system may provide a self cleaning mode in addition to the "bake-out" mode which is also a type of self cleaning. In the self-cleaning mode, the drift tube 12 and the sample channel are both heated while the pump 50 is operated. Optionally the air purification system 24" may also be heated. Air flows are reversed in some regions where contamination from previous sampling could occur (e.g. past the desorber). This may assist in removing contamination from the detector inlet 10. Two such self-cleaning states may be provided (state 1 and state 2). In state 1, flow in the air purification system is routed through the first sieve, whilst in state 2 it is routed through the second sieve. In both of these two self-cleaning states, parts of the IMS to be cleaned, such as the drift chamber 12, the reaction region, and the detector inlet (or one or more thereof) may be heated. Air flowing "backwards" out of the reaction region flows into the sampling inlet (e.g. in the reverse direction to flow of air during sampling). Air that has been dried using the air purification system is used for this purpose, and the air is routed back to the inlet of the air purification system to be cleaned.

The air purification system 24" illustrated in FIG. 1 is able to perform bake-out with concurrent regeneration of one or other of the two sieves. In bake-out and regen—state 2, the system is heated (e.g., one or more parts of the IMS to be cleaned, such as the drift chamber 12, the reaction region, and the detector inlet). Whilst this heating is performed, the flows of air in the IMS outside the air purification system are controlled as described above with reference to the self-cleaning mode. In addition however the intake valve 80 is switched on to allow ambient air to be drawn into the system via the air intake.

In bake-out+regen state 2, both the sieve valves 82, 84 are switched off while the outtake valve 86 is switched on. As a result, part of the cleaned dried air that is provided to the input of the first one-way valve 90 by the first sieve 70 is routed through the flow impedance orifice to the second port of the second sieve 72. It then flows "backwards" through this sieve, to the outtake valve. The outtake valve is on which allows this flow to pass out of the air purification system via the evaporator. Thus, while the system as a whole is "baking out", the second sieve can be regenerated by air which has been sieved by the first sieve. Conversely, in bake out and regen state 1, the two sieve valves are both on, so that the flow from the air purification system inlet flows through the second sieve before being routed partly to the outlet of the air purification system by the second one way valve, and partly to the first sieve by the flow impedance orifice. It then flows "backwards" through this first sieve, to the outtake valve and the evaporator. It can thus be seen that whilst the system as a whole is "baking out", one of the two sieves can be regenerated using the other sieve. Air carrying "baked off" contaminants flows into non-regenerating sieve during this process, where it is cleaned as in the self-cleaning mode explained above. This arrangement may have the advantage of avoiding the need for additional pumps, and also avoiding the need for additional drying systems such as the use of selectively permeable membranes.

Other embodiments are envisaged. For example the system has been described as having two molecular sieves but a greater number of sieves may be used.

Embodiments of the disclosure provide a modification of the air-flow system used to maintain dry and clean air in detector systems. They may be used in ion mobility spectrometry based detectors, but may also be used in other trace chemical detectors in which a supply of cleaned dried air is required.

The molecular sieves described herein may be of any appropriate type, such as those used in IMSs and other detection apparatus to remove unwanted chemicals from gas supplied to the detection apparatus. For example, the molecular sieves may comprise pieces of an absorbent and/or adsorbent material such as zeolite packed together into a housing. For example the pieces may be spheres, e.g. about 2 mm in diameter. The housing may be connected in to a gas flow path so that gas flowing through the pack follows a tortuous path around the outside of the pieces of material with some of the gas flowing through the material. Other types of molecular sieve may be used, such as those in which the sieve is formed of a solid block of molecular sieve material provided with a multiplicity of gas passages extending through it. In such sieves the gas flow through the sieve may primarily be confined to flow through the interior of the block. The block may comprise zeolite.

The one way valves 90, 92 are optional and could be replaced by any appropriate flow control means such as active flow control valves, which may be provided by three port valves such as those described above. The safety valve 54 described herein is optional, and the system may be provided without them. It will also be appreciated in the context of the present disclosure that the function of the three port valves 80 and 86 shown in FIG. 1 may be provided by any appropriate valve, such as a simple on/off valve. As another example—flow impedance orifices have been described, and may provide a way to divide one part of a flow of air from another—e.g. by using a balance of pressure drops in different parts of the system. However any appropriate flow controller may be used, for example other types of flow restrictor (not just flow orifices), a mass flow controller such as a needle valve, a pump, a proportional valve, or any other flow control means.

The bake-out mode described herein may differ from the "self-cleaning mode" in that the self-clean duration may be shorter than the duration of the bake-out, for example from about 30 s to a few minutes. By contrast bake-out may take longer and may be scheduled to take place periodically for example overnight or when the machine has got unusually contaminated and a standard "self-clean" is not succeeding to clean the instrument. In self clean mode a smaller number of components may be heated than in bake-out. For example, in bake-out mode those components which take longer to cool down may be heated whereas in self clean mode they are not.

Any feature of any one of the examples disclosed herein may be combined with any selected features of any of the other examples described herein. For example, features of methods may be implemented in suitably configured hardware, and the configuration of the specific hardware described herein may be employed in methods implemented using other hardware.

It will be appreciated from the discussion above that the embodiments shown in the Figures are merely exemplary, and include features which may be generalised, removed or replaced as described herein and as set out in the claims. With reference to the drawings in general, it will be appreciated that schematic functional block diagrams are used to indicate functionality of systems and apparatus described herein. It will be appreciated however that the functionality need not be divided in this way, and should not be taken to imply any particular structure of hardware other than that described and claimed below. The function of one or more of the elements shown in the drawings may be further subdivided, and/or distributed throughout apparatus of the disclosure. In some embodiments the function of one or more elements shown in the drawings may be integrated into a single functional unit.

In some examples the functionality described above may be operated under computer control, such as may be provided by a programmable processor or other such control logic. This may be achieved using a general purpose processor, which may be configured to perform a method according to any one of those described herein. In some examples such a controller may comprise digital logic, such as field programmable gate arrays, FPGA, application specific integrated circuits, ASIC, a digital signal processor, DSP, or by any other appropriate hardware. In some examples, one or more memory elements can store data and/or program instructions used to implement the operations described herein. Embodiments of the disclosure provide tangible, non-transitory storage media comprising program instructions operable to program a processor to perform any one or more of the methods described and/or claimed herein and/or to provide data processing apparatus as described and/or claimed herein. The controller may comprise an analogue control circuit which provides at least a part of this control functionality. An embodiment provides an analogue control circuit configured to perform any one or more of the methods described herein.

The above embodiments are to be understood as illustrative examples. Further embodiments are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of operating an air purification system of an ion mobility spectrometer, the method comprising:
   operating the ion mobility spectrometer in a first sampling mode comprising circulating a flow of air around a closed air circulation system comprising a drift chamber of the ion mobility spectrometer and a first sieve of the air purification system; and
   operating the ion mobility spectrometer in a first regeneration mode comprising heating the first sieve and circulating a first flow of air through a second sieve of the air purification system and through the drift chamber while passing a second flow of air through the first sieve to an outtake.

2. The method of claim 1 wherein in the first regeneration mode the second flow of air is provided from the second sieve.

3. The method of claim 1 wherein in the first regeneration mode, a flow of ambient air is mixed with air taken from the ion mobility spectrometer.

4. The method of claim 1 wherein in the first regeneration mode the second flow is provided by part of the first flow.

5. The method of claim 1, comprising switching the ion mobility spectrometer into a second sampling mode in which the second sieve is used in place of the first sieve in the closed air circulation system.

6. The method of claim 5, wherein the ion mobility spectrometer is operated in the first regeneration mode and the second sampling mode concurrently.

7. The method of claim 6 in which said concurrent operation comprises using the first flow of air to provide the drift gas for operation of the ion mobility spectrometer to analyse a sample while heating the first sieve to regenerate the first sieve.

8. The method of claim 1, comprising switching the ion mobility spectrometer into a second regeneration mode comprising heating the second sieve and circulating the first flow of air through the first sieve of the air purification system and through the drift chamber while passing the second flow of air through the second sieve to an outtake.

9. An air purification system for an ion mobility spectrometer, the system comprising:
   an inlet and an outlet, wherein the inlet and the outlet are configured to connect the air purification system to the drift chamber of the ion mobility spectrometer to form a closed air circulation system;
   an outtake for exhausting air;
   a first sieve, and
   a second sieve,
   wherein the air purification system is configured to provide a first sampling mode in which air is circulated around the closed air circulation system and the first sieve is connected to form part of the closed air circulation system, and
   the air purification system is configured to be switched into a first regeneration mode in which the first sieve is heated and a first flow of air is circulated through the second sieve and through the drift chamber while passing a second flow of air through the first sieve to the outtake to be exhausted from the ion mobility spectrometer.

10. The system of claim 9 wherein in the first regeneration mode the second flow of air is provided from the second sieve.

11. The system of claim 9 wherein in the first regeneration mode the second flow is provided by part of the first flow.

12. The system of claim 11 comprising a flow orifice arranged to separate the part from the first flow to provide the second flow.

13. The system of claim 12 comprising an outtake valve which can be opened to allow the second flow of air to flow to the outtake, and which can be closed to prevent said flow to the outtake.

14. The system of claim 9 in which the air purification system is further configured to be switched into a second sampling mode in which the second sieve is used in place of the first sieve in the closed air circulation system.

15. The system of claim 9, in which the air purification system is operable in a second regeneration mode in which the second sieve is heated and the first flow of air is circulated through the first sieve and through the drift chamber while passing the second flow of air through the second sieve to the outtake to be expelled from the ion mobility spectrometer.

16. The system of claim 15, wherein the system is configured to be operated in the first sampling mode and the second regeneration mode concurrently.

17. The system of claim 16 in which said concurrent operation comprises using the first flow of air to provide the drift gas for operation of the ion mobility spectrometer to analyse a sample while heating the second sieve to regenerate the second sieve.

18. An ion mobility spectrometer comprising:
an air purification system comprising an inlet and an outlet a first sieve and a second sieve selectively connectable between the inlet and the outlet;
a drift chamber connected between the outlet and the inlet of the air purification system so that cleaned dried air from the outlet of the air purification system can be provided through the drift chamber;
an outtake, connected to the air purification system, for expelling air from the ion mobility spectrometer; and
a heater
wherein the air purification system is configured to regenerate the first sieve by heating the first sieve and diverting air dried by the second sieve through the first sieve to the outtake, and
wherein the air purification system is configured to regenerate the second sieve by heating the second sieve and diverting air dried by the first sieve through the second sieve to the outtake.

19. The ion mobility spectrometer of claim 18 wherein during regeneration of the first sieve air dried by the second sieve is also circulated from the outlet of the air purification system through the drift chamber to the inlet of the air purification system.

* * * * *